United States Patent [19]

Williams

[11] 3,973,922

[45] Aug. 10, 1976

[54] ARTIFICIAL LOGS AND LOG-MAKING METHOD AND APPARATUS

[76] Inventor: Thomas A. Williams, 620 S. Fourth St., Towanda, Pa. 18848

[22] Filed: Apr. 29, 1974

[21] Appl. No.: 464,795

[52] U.S. Cl. .................................. 44/13; 44/10 B; 100/209
[51] Int. Cl.² ...................... C10L 5/22; C10L 5/00; B29J 5/02; B29J 5/08
[58] Field of Search ........................... 44/2, 11–13; 100/93, 209

[56] References Cited
UNITED STATES PATENTS

| | | | |
|---|---|---|---|
| 3,232,722 | 2/1966 | Sanders | 44/13 |
| 3,427,960 | 2/1969 | Napolitano | 44/13 X |
| 3,506,415 | 4/1970 | Paladino | 44/13 |

Primary Examiner—Carl F. Dees
Attorney, Agent, or Firm—Richard G. Stephens

[57] ABSTRACT

Artificial logs are made by forcing a mixture of wood chips and a binder such as wax or paraffin through a tube by means of a feed screw. A section of the tube beyond the feed screw includes a short first portion of constant diameter which by itself has an insufficient length to provide enough friction to generate adequate pressure, followed by a second portion of variable cross-section, the cross-section of which is controlled by a predetermined force, so that friction and pressure in both sections may be readily controlled and limited to values which adequately form logs without the use of excessive power or the generation of excessive heat. By periodically varying the force on the adjustable section portion, a continuous length of log stock being formed may be severed into successive lengths without need for a subsequent sawing operation.

20 Claims, 1 Drawing Figure

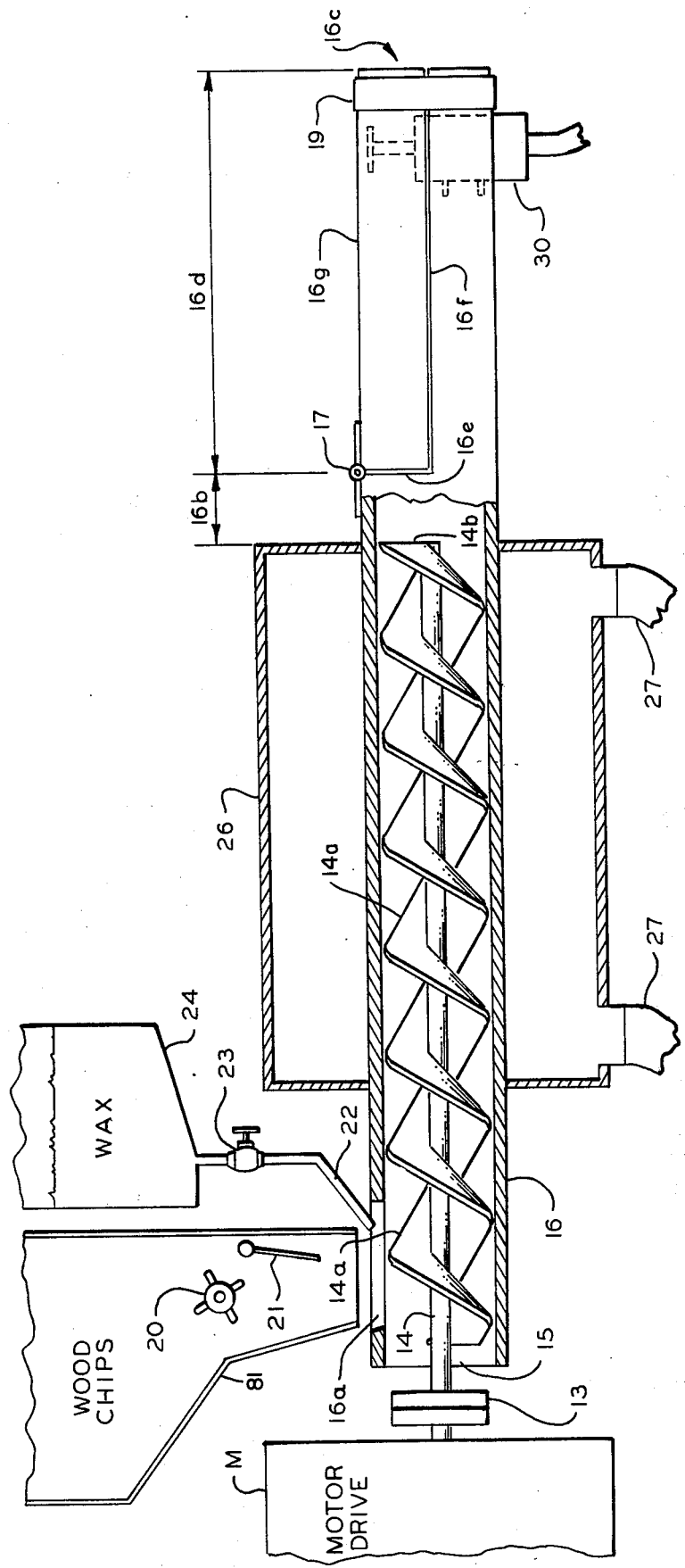

ARTIFICIAL LOGS AND LOG-MAKING METHOD AND APPARATUS

My invention relates to improved artificial logs, and to method and apparatus for making such artificial logs by compressing a mixture of lignocellulose material and a flowable binder, and further, to method and apparatus which are economical and inexpensive to practice and construct. Several prior art methods and devices for making artificial logs are disclosed in U.S. Pat. Nos. 3,232,722 and 3,506,415.

Various prior art methods and apparatus provide artificial logs by subjecting mixtures of sawdust and molten wax to high temperatures and pressures, and by intensely "beating" such mixtures to eliminate voids or hollow spaces within the finished logs. While such prior art techniques tend to provide uniformaly-burning artificial logs, the logs so produced disadvantageously tend to have a distinctly artificial "plastic" appearance and feel which decreases their sales appeal. One object of the present invention is to provide artificial logs having an appearance and a feel more closely resembling those of natural logs.

The practice of various prior art methods requires apparatus which is expensive to construct and to operate. One very important object of the present invention is to provide artificial log-making apparatus which is much less expensive to construct, and another object is to provide apparatus which is less expensive to operate. Like several prior art devices, the apparatus of the present invention utilizes a motor-driven feed screw to provide artificial logs by extruding a mixture through a tube or pipe. The friction of the mixture against the walls of the pipe generates substantial heat. In prior art devices of that nature of which I am aware, intense pressures and much heat are generated, so that substantial amounts of cooling water are required to prevent the pipe from overheating. One object of the present invention is to provide apparatus which requires much less cooling water. The prior art devices also require large (e.g. 60 horsepower) drive motors, which consume substantial amounts of electrical power. Another object of the present invention is to provide apparatus which may use a much smaller motor and which will consume substantially less electrical power.

Various prior art artificial log-making devices use reciprocating rams to compact various mixtures. The pressure with which the mixture is compacted may be easily controlled by controlling the ram pressure. Systems which utilize rotary feed screws are deemed preferable because they may be made more inexpensively and have the advantage of operating continuously rather than in discrete reciprocating cycles. However, continuous feed screw-extrusion-type systems have the disadvantage that the pressures to which their mixtures are subjected cannot be easily controlled, as will be explained below.

In order that artificial log stock created by explusion of a mixture through a tube not be too crumbly or easily broken, it is necessary that the mixture be compacted with sufficient pressure. As a mixture is pushed through the tube in prior art apparatus, the pressure which occurs depends not only upon the feed screw pitch and speed of rotation, but also to a great degree upon the frictional characteristics of the mixture portions relative to themselves and the frictional characteristics of portions of the mixture relative to the inside walls of the tube. However, these relationships are not simple, nor easily predictable. Friction between two bodies is proportional to the force between them, as well as the coefficient of friction, and where a mixture is urged through a tube, friction and pressure also depend upon the length of the tube. As a mixture of sawdust and wax is urged through a tube, an increase in pressure causes an increase in friction, which in turn causes a further increase in pressure, in a highly complex non-linear exponential type of relationship. For example, a given mixture being urged by a given prior art feed screw through a tube of given length under one set of conditions might pass easily through the tube without experiencing substantial compaction pressure, and emerge as a crumbly uncompacted mixture, but instead experience very great pressure and emerge as a very solid piece with an extremely slight change in an operating condition, such as a slight change in screw speed, or mixture temperature, or mixture composition, or tube length. One might say that with a given set of other operating conditions, there is a boundary condition for each of various parameters, below which substantial friction and pressure will not build up, and above which very large values of friction and pressure will build up. In order that minor variations in motor speed, material characteristics and the like not result in insufficient compaction, the prior art systems have used screw speeds, sizes and tube lengths so that the applicable boundary condition for each of these parameters will always be exceeded, even with expected variations in speed, material characteristics and the like. While such a technique insures that adequate friction and pressure will always build up to form an acceptably compacted product, it has the marked disadvantage that the pressure and friction may, and ordinarily will, build up to values greatly exceeding, sometimes by several orders of magnitude, the values necessary to form an adequately compacted log. To the extent pressures and temperatures caused by friction exceed the minimum values necessary to form an adequately compacted log, power is wasted, cooling water is wasted, excess motor capacity is required, and various system parts must be made heavier to withstand unnecessary torques and pressures. In accordance with one important concept of the present invention, the friction and pressure which will occur in the tube are automatically limited, so that they may build up to values sufficient to form an acceptably-compacted log stock, but so they cannot exceed such values. Thus important objects of the present invention are to provide artificial log-making method and apparatus wherein friction and pressures which occur as a ligno-cellulosic material and a flowable binder are forced through a tube are automatically limited. In addition to such advantages, limiting pressure and friction, in accordance with the technique of the present invention, to values sufficient to adequately compact the mixture, and avoiding the excessive values used by prior art feed screw compaction systems, provides an artificial log stock having much less of an artificial or plastic appearance, and a much more natural appearance and feel.

In order to thoroughly mix a ligno-cellulosic material and a slack wax, it is necessary that the wax be heated to a temperature so that it flows easily and will thoroughly mix with sawdust or wood-chips or the like. From that observation one might suppose that the intense heat generated by prior art processes was necessary or desirable in order to provide thorough mixing. However, it has been found that a lower initial binder temperature than that ordinarily used by the prior art is quite adequate for satisfactory mixing, and that the added heat generated by prior art devices is not only wholly unnecessary for thorough mixing, but it disadvantageously interferes with efficient log formation. In addition to wasting motive power and cooling water, the prior art systems require longer extruding barrels, since as a log is being formed, it must be held in some type of cylindrical form until it has cooled sufficiently that the wax has sufficiently solidified. However, providing a longer extruding barrel, so that a log portion will have a longer cooling time is in itself somewhat of a self-defeating technique, since a longer barrel causes more friction and generates more heat. Thus very long cooling barrels supplied with large amounts of cooling water have been required in the prior art. In accordance with the present invention, the wood chip-wax mixture is initially mixed, with the mixture being cooled as it is being mixed, from an initial temperature (e.g. 140° F) at which the wax is readily mixable, down to a lower temperature at which the wax may not be much above its solidifying temperature, all before the mixture is subjected to major compaction, while the mixture is being transported along the length of the feed screw. Then, with the mixture initially at that temperature, it is subjected to controlled pressure and friction in a first compaction zone (16b) which has a very short length compared to those of the prior art, so that only a modest increase in temperature occurs as the mixture is compacted in that zone. Then the mixture passes through a second compaction zone (16d) where final cooling occurs, without the need of a further water cooling jacket. The friction and pressure occurring in the second compaction zone are sufficient to hold the log stock properly formed as final cooling takes place, but may be markedly less than those which occur in the first or major compaction zone. And as will be seen, automatic control of pressure and friction in the second compaction and cooling zone automatically controls the pressure and friction which occur in the first or major compaction zone.

Compression of a ligno-cellulosic and wax mixture by use of a continuously rotatable feed screw contained within an elongated casing is shown, for example, in U.S. Pat. No. 3,506,415. Such apparatus produces a continuous length of artificial log stock which then must be sawed into pieces of desired length. In accordance with a further important aspect of the invention, a continuous length of compacted log being formed by the apparatus of the invention may be separated into pieces of desired length without a need for any subsequent sawing or cutting operation or apparatus, and without stopping the rotation of the feed screw or otherwise interrupting the continuous compaction process, and provision of such method and apparatus is another important object of the invention.

Other objects of the invention will in part be obvious and will in part appear hereinafter.

The invention accordingly comprises the several steps and the relation of one or more of such steps with respect to each of the others, the apparatus embodying features of construction, combinations and arrangement of parts which are adapted to effect such steps, and the article which possesses the characteristics, properties, and relation of elements, all as exemplified in the detailed disclosure hereinafter set forth, and the scope of the invention will be indicated in the claims.

For a fuller understanding of the nature and objects of the invention reference should be had to the following detailed description taken in connection with the accompanying drawing, in which:

The single Figure is an elevation side view of one form of apparatus constructed according to the present invention, with various parts shown in cross-section.

In the Figure an electric motor drive is shown at M as a simple block, and in typical applications it will comprise a conventional electric motor driving a conventional gear reducer. In one successful embodiment of the invention a 1.5 HP induction motor having a speed of 1725 rpm was connected through a gear reduction of 9.75 to 1 to provide an output shaft rotation at approximately 177 rpm. The motor drive output shaft is connected through couping 13 to rotate feed screw 14 situated within cylindrical pipe 16. The rear end of pipe 16 is open, and feed screw 14 extends therethrough into pipe 16. Feed screw 14 has a screw flight 14a of uniform outside diameter and uniform pitch. Most prior art devices, such as that of U.S. Pat. No. 3,506,415, require feed screws having a varying diameter, and/or a varying screw pitch. Because it has a uniform outside diameter and a uniform pitch, it will be apparent that feed screw 14 is considerably easier to construct and hence less expensive. The forward end 14b of the feed screw comprises a simple cut perpendicular to the axis of the screw, so that the end of the screw flight rotates in a plane. Feed screw 14 is concentrically located within pipe 16, which also has a uniform inside diameter. The inside diameter of pipe 16 is preferably only slightly greater than the outside diameter of the feed screw, so that the feed screw may rotate inside the pipe without substantial metal-to-metal friction. A diametrical clearance of the order of 0.001 inch is deemed satisfactory, although it is by no means critical. The use of a feed screw diameter just slightly less than the inside diameter of the pipe operates to automatically center the screw within the pipe, making it unnecessary that the feed screw be journalled in any bearings. Inasmuch as the wax or paraffin in the mixture transported by the feed screw lubricates the feed screw, a fairly close fit of the screw within the pipe may be provided without appreciable wear of the feed screw or inner pipe wall. Various prior devices, such as that of U.S. Pat. No. 3,506,415 use barrels or pipes which are at least in part non-circular, so that the compacted mass is expelled from the pipe without rotation around the central axis of the pipe. A standard piece of cylindrical pipe is not only less expensive to provide, but it is believed that the use of such a pipe, which allows the compacted mixture to rotate, considerably lessens the amount of heat generated by friction, and thereby reduces the amount of water-cooling which is required. In one practical embodiment of the invention, a feed screw approximately 36 inches long having an outside diameter just slightly less than 2.5 inches and a pitch of 2 five-sixteenths inches per turn was used within a pipe 16 having an inside diameter of 2.5 inches.

Pipe 16 is cut half way through as shown at 16e, at a distance shown as dimension 16b forward from the end of the feedscrew and distance 16b from the forward end of the pipe, and also cut longitudinally as shown at 16f through both side walls of the pipe, so as to provide a semi-cylindrical pipe "flap" 16g, which is pivotally affixed to the remainder of the pipe by hinge 17. Resilient retaining means shown as comprising a rubber band 19 surrounds the end of the pipe, tending to hold the flap 16g "closed", i.e. against the remainder of pipe 16. Since saw cuts 16e and 16f have finite width, it will be seen that when zone 16d of the pipe is empty, flap 16g may be pulled slightly toward the lower semi-cylindrical of the exit end of pipe 16, so that the zone 16d will have a slightly smaller average cross-sectional area than the remaining portions of the pipe, tapering slightly down from equal area at hinge 17 to a minimum area at its rightward extremity. With a given pressure of wood chip-wax mixture in zone 16d, flap 16g will extend parallel to the axis of the pipe, so that zone 16d will have a cross-sectional area equalling that of zone 16b and the remainder of the pipe, and with greater mixture pressure within zone 16d, flap 16g will be swung slightly upwardly as viewed in the FIGURE, so that zone 16d will have an average cross-sectional area greater than that of zone 16d, varying from a minimum area equal to that of zone 16d at hinge 17 to a maximum area at its rightward extremity.

Hopper 18 is continuously fed a supply of wood shavings by conveyor means (not shown). At this point it can be mentioned that the use of dry kiln wood shavings is much to be preferred to the use of the sawdust used by the prior art. Wood shavings are commonly available from planing operations at sawmills and lumber-making plants. In the practice of the invention, shavings having a length of about ¼ inch, a width of about ⅛ inch, and thicknesses of the order of 0.001 to 0.005 inch are deemed ideal. Because many sawmills and lumber-making plants intermix wood shavings and sawdust, however, it is sometimes economically desirable to supply a mixture of wood shavings and sawdust to hopper 18.

A variety of conventional conveyor means may be used to supply the shavings to hopper 18. It is sometimes desirable that an agitator be provided within hopper 18 to provide uniform feeding of shavings from the hopper, and in the drawing a rotary agitator is shown at 20. The shavings are continuously expelled from hopper 18 into pipe 16a through opening 16a at the top of the pipe. In the specific embodiment being described, shavings were expelled at a rate of roughly 0.4 cubic feet per minute. A rotary plate 21 within hopper 18 may be used, in conjunction with the conveyor feeding hopper 18, to control the downward flow rate of shavings through the hopper. Pipe 22 extends from tank 24, in which a supply of molten wax is carried, to opening 16a in pipe 16, so that the molten wax is directed in a stream onto feed screw 14, and as the feed screw rotates, the wax is mixed with the wood shavings. This arrangement advantageously obviates the need for premixing hoppers or the like which some prior art systems have required. Valve 23 may be adjusted to control the flow rate of the molten wax. The temperature of the wax in tank 24 may be of the order of 140° F. A length of pipe 16, preferably extending from very near opening 16a all the way to the forward end of the screw, is surrounded by a cylindrical outer casing forming a cooling-water jacket 26, through which cold tap water is circulated by means of hoses 27, 27, the water flow rate being controlled by an ordinary water valve (not shown). In the embodiment being described, jacket 26 was approximately 14 inches long.

As wood shavings and molten paraffin or wax are introduced into opening 16a as the feed screw rotates, a mixture of wax-covered shavings is transported rightwardly from opening 16a in the FIGURE. During start-up, a loose, crumbly mixture of wax and shavings will eventually emerge from exit end 16c of pipe 16. If exit end 16c is then momentarily blocked (as by momentarily holding a plate against end 16c) as soon as the loose mixture begins to be expelled, the pressure quickly rises in sections 16b and 16d of the pipe, causing the portion of the mixture in those sections of the pipe to frictionally engage the inside of the pipe, and when the exit end of the pipe is then unblocked, the friction tends to maintain pressure in those two sections of the pipe. Because screw 14 has uniform pitch, the mixture is initially transported into the cooling zone surrounded by jacket 26 without substantial compaction. With substantial pressure occurring in zone 16b, some pressure will be propagated rearwardly through the mixture portions being transported by the feed screw. The pressure in the mixture will vary along the length of the screw, from a maximum at the front end of the screw, to substantially zero pressure at the rear end of the screw. Thus as the mixture travels through the cooling zone, it is mixed and cooled, but appreciably compacted only as it nears the forward end of the feed screw and as it passes righwardly therebeyond. Maximum pressure and maximum compaction occurs as the mixture passes through zone 16b. The amount of pressure which is reflected from zone 16b rearwardly into the cooling zone depends upon the magnitude of the pressure in zone 16b. If zone 16b beyond the end of the feed screw is too long, the friction occurring in that zone will become very great, requiring a very powerful motor to rotate the feed screw, and large amounts of heat will be generated, requiring the use of extensive cooling water. The prior art has used compaction zones having lengths which are many times the pipe diameter, so that much electrical power and much cooling water have been required. The present invention, on the other hand, utilizes a fixed compaction zone 16b which is even less in length than the diameter of the pipe, together with a variable compaction zone provided by pivotable pipe flap 16g. In several embodiments of the invention utilizing different pipe diameters, a 16b zone length approximately 60 percent of the pipe diameter has been found to be ideal.

The length of zone 16b is preferably selected so that zone 16b itself provides insufficient compaction to provide a well-formed log. That is to say, if rubber band 19 is removed, so that flap 16g is freely pivotable, the continuous length of artificial log which is expelled from the pipe will not be properly formed, and will crumble and break easily. However, with rubber band 19 urging flap 16g against pipe 16 with a given force, a predetermined essentially-constant pressure is maintained in zone 16d, and, importantly, pressure in zone 16g in turn controls the pressure which occurs in fixed compaction zone 16b. In practice, as the compacted mixture passes from zone 16b to zone 16d, an extremely minute pivoting of flap 16d occurs, typically of the order of 0.5 to 2.5 degrees, so that the force applied by band 19 is essentially constant. Even though the pivoting of flap 16d is very slight and the force required by band 19 is quite small, a very slight pivoting of the flap greatly affects the friction in zone 16d, and greatly affects the maximum pressures which may occur in zone 16b and 16d.

As the mixture travels along the feed screw 14 and through zones 16b and 16d, the mixture rotates about the pipe axis as well as being moved forwardly. The rotation varies, typically by a factor greater than forty, from adjacent the feed screw, where the mixture is constrained to rotate with the feed screw, at a rotational speed of 177 rpm, for example, to a much slower rotation in zones 16b and 16d, of the order of 4 rpm.

By varying the clamping force exerted on flap 16g by rubber band 19, one may readily control the pressures in zones 16d and 16b throughout three distinct ranges, including a first range with zero or insufficient force on flap 16g so that the artificial log is insufficiently compacted, a second range using additional force in which the log is uniformly compacted to the desired degree, and a third range using a greater force on flap 16g which is sufficient to "lock" the portion of mixture in zones 16b and 16d against rotation, which causes the mixture to be sheared at the forward end of the feed screw. As a length of log is being formed, rubber band 19 provides an essentially-constant force on flap 16g, thereby controlling the friction and pressure in zones 16b and 16d at substantially-constant desired values which are sufficient to adequately compact the log, without allowing the occurrence of extreme friction and pressure. Then, periodically, as desired lengths of log stock are emitted, the force on flap 16g may be temporarily increased to the mentioned third range, causing the mixture to be sheared at the forward end of the feed screw. In the drawing an air cylinder 30 is shown mounted on pipe 16 with its ram connected to engage a tap on flap 16g, so that momentary application of pressure to the cylinder momentarily pulls the flap tightly against the pipe. It will be apparent that a variety of equivalent means, may be used to apply increased clamping force momentarily to flap 16g. When the increased pressure on the flap is removed, the severed section of artificial log is then pushed forwardly, without being rotated, by the next section of log stock being formed by the feed screw, which latter section will be rotating. The rotation of the new section being formed relative to the just-formed piece which has been severed will be seen to prevent the ends from re-joining.

It is possible, and within the broad scope of the invention, to make zone 16b extremely short in length, so that less pressure is generated by friction in zone 16b, but then the additional pressure needed to adequately compact the mixture must be provided by lengthening section 16d and/or increasing the force on flap 16g. However, use of a zone 16b of fixed diameter having a length somewhere between 30 and 70 percent of the pipe diameter is deemed extremely desirable. It allows control of a short section 16d with small forces. In the mentioned device using 2.5 inch (inside diameter) pipe, where zone 16b was 1 seven-sixteenths inch long, zone 16d was 8 ⅞ inch long, and band 19 applied a force of the order of 20–40 pounds to flap 16g. Needless to say, zone 16b cannot be made too long, given a given feed screw diameter and speed, or else friction and pressure in zone 16b will rise to extreme values even if zero force were applied by band 19, and the disadvantages experienced by prior art systems would occur. The exact length of zone 16d is not critical, but use of lengths at least twice as great as the pipe diameter ordinarily will be preferred. It should be noted that an appreciable amount of cooling occurs in portions of the log stock passing through zone 16d.

In addition to automatically limiting friction and pressure, the provision of flap 16g also desirably helps provide product uniformity. If an excess amount of wax or paraffin exists in a portion of mixture passing through section 16d, some excess will be squeezed out through slits 16e and 16f. It will be apparent that band 19 need not be adjacent the end of the flap 16g, but that spacing the band as far as possible from the pivot axis of hinge 17 reduces the amount of force which the band need be required to apply to the flap. It will be apparent at this point that various means other than a resilient band may be used to apply an equivalent force to the flap, such as a simple weight, for example, positioned atop the flap. It may be noted that in practice of the present invention, the cooling jacket cools the mixture before major extrusion of the mixture occurs, while prior art apparatus (e.g. U.S. Pat. No. 3,506,415) must place its cooling jacket around the lengthy cylindrical barrel in which extrusion occurs, due to the intense heat which occurs in the operation of that prior device.

In practice of the invention, I prefer to limit the maximum pressure which occurs within the pipe to values merely adequate to provide a well-formed log. So limiting the maximum pressure, together with use of wood shavings, provides an artificial log stock having an appearance and a feel much more closely resembling those of actual logs. Typically, the artificial log stock produced in accordance with the invention preferably comprises 40% by weight of wood shavings, or shavings plus sawdust, and 60% by weight of paraffin or wax. Semi-refined or type IP2 slack wax paraffin sold by Quaker State Oil Company has proven satisfactory.

The use of a feed screw of uniform pitch is not essential for the pressure and friction limiting means to operate effectively. A feed screw having decreased pitch near its forward end may cause a greater pressure to occur in zone 16b independently of the action of zone 16d, however, and may require that zone 16b have even less length than that previously suggested if the same dimensions and forces are to be used at zone 16d. Use of an extremely short zone 16b may tend to make operation of zone 16d more sensitive and critical, so that use of a feed screw having uniform pitch is preferred for that reason, in addition to being preferred because it is much easier to fabricate.

While the invention has been illustrated in connection with the forming of artificial logs comprising slack wax or paraffin and wood chips with or without sawdust, it should be noted that the mixtures used also may contain various additional constituents, such as ignitors and additional types of binders. Further, it will be apparent at this point, that since the invention limits the friction, pressure and heat which have accompanied prior art processes, heat-sensitive constituents which are not usable with prior art processes may be readily used in the practice of the invention.

During typical operation, with a feed screw pitch of 2.31 inches per turn and a feed screw rotation of 177 rpm, it will be apparent that the mixture is initially moved along the pipe at 413 inches per minute. However, as the mixture is compressed within the pipe, a continuous length of artificial log will be expelled from the pipe at approximately 80 inches per minute.

It will thus be seen that the objects set forth above, among those made apparent from the preceding description, are efficiently attained. Since certain changes may be made in carrying out the above process, in the described product and in the constructions set forth without departing from the scope of the invention, it is intended that all matter contained in the above description and shown in the accompanying drawing shall be interpreted as illustrative and not in a limiting sense.

The embodiments of the invention in which an exclusive property or privilege is claimed are defined as follows:

1. The method of forming artificial logs comprising the steps of rotatably forcing a mixture of ligno-cellulosic material and a flowable binder through first and second tube sections in succession to compact said mixture by pressure and friction occurring in said tube sections, and simultaneously controlling the cross-section of said second tube section to limit the friction and pressure occurring in both said first and second sections.

2. The method according to claim 1 wherein said step of rotatably forcing said mixture comprises feeding said mixture into said first tube section by means of a rotatable feed screw.

3. The method according to claim 1 wherein said step of controlling said cross-section of said second tube section comprises applying a predetermined force to maintain said cross-section at a given value, whereby pressures in said mixture exceeding a predetermined value are operative to expand said cross-section of said second section to limit the pressures occurring in said first and second sections.

4. The method according to claim 1 wherein said step of controlling said cross-section comprises a step of normally controlling said cross-section to provide a reduced value of friction allowing said mixture to rotate within said first and second sections, and a step of periodically reducing said cross-section to provide an increased value of friction preventing said mixture from rotating within said first and second sections, thereby severing portions of said mixture in said sections from portions of said mixture being forced into said first section.

5. Apparatus for forming artificial logs, comprising, in combination: a cylindrical casing having an entry end portion, an intermediate portion and an exit end portion; a rotatable feed screw disposed within said casing and extending along said entry end portion of said casing to said intermediate portion; means for introducing ligno-cellulosic material and a flowable binder material into said entry end portion of said casing, whereby said feed screw may transport said materials into said intermediate and exit end portions of said casing, said exit end portion of said casing having a portion movable to vary the cross-sectional area of said exit end portion; and means for applying a force to said movable portion to control movement of said movable portion, thereby to control the friction and pressures occurring within said intermediate and exit end portions of said casing.

6. Apparatus according to claim 5 wherein said entry end portion and said intermediate portion of said casing have the same diameter.

7. Apparatus according to claim 5 wherein said feed screw has a constant diameter along its length.

8. Apparatus according to claim 5 wherein said feed screw has a screw flight of constant pitch along said entry end portion of said casing.

9. Apparatus according to claim 5 having a cooling jacket surrounding a length of said entry end portion of said tubular casing.

10. Apparatus according to claim 5 wherein said feed screw has a screw flight substantially equal to diameter to the internal diameter of said entry end portion of said casing.

11. Apparatus according to claim 5 wherein said exit end portion of said casing comprises a first semi-cylindrical portion having a diameter corresponding to the diameter of said intermediate portion, said movable portion comprises a semi-cylindrical flap portion having a diameter corresponding to said diameter of said intermediate portion, and said flap portion is pivotally attached to said first semi-cylindrical portion.

12. Apparatus according to claim 5 wherein said intermediate portion is less in length than in diameter.

13. Apparatus according to claim 11 wherein said means for applying a force to said flap portion comprises means for urging said flap portion toward said first semi-cylindrical portion with a predetermined force.

14. A feed screw compaction means for forming artificial logs which includes feed screw means for forcing a mixture forwardly through a tubular casing having a section which extends beyond the forward end of said feed screw, said section including a first cylindrical portion of fixed cross-section adjacent said forward end of said screw, and a second cylindrical portion of adjustable cross-section adjacent said first section; and means for controlling adjustment of said second cylindrical portion to limit the friction and pressures occurring in said section to said tubular casing.

15. The method according to claim 1 which includes cooling said first tube section.

16. The method according to claim 1 wherein said step of rotatably forcing said mixture comprises rotating a feed screw which extends within said first tube section at a substantially constant rotational speed.

17. The method according to claim 1 which includes the step of momentarily blocking the exit end of said second tube section to provide an increase in the friction and pressure of said mixture in said second tube section.

18. Apparatus according to claim 5 wherein said means for applying a force to said movable portion of said exit end portion comprises resilient means adapted to apply a substantially constant force to said movable portion.

19. A feed screw compaction and extrusion apparatus which includes, in combination: feed screw means for forcing a mixture containing wood particles and liquid forwardly through a tubular casing at substantially constant entry and exit rates, said tubular casing having a first section of fixed cross-sectional area adjacent the forward end of said feed screw means and a second section of variable cross-sectional area connected to receive mixture forced from said first section by said feed screw means, said second section being yieldable, whereby said cross-sectional area of said second section varies as a function of the pressure of said mixture in said second section of said casing.

20. Apparatus according to claim 19 wherein said second section comprises a pivotally mounted flap, and means for applying a predetermined force to said flap to yieldably oppose an increase in said variable cross-sectional area of said second section.

* * * * *